US009426740B2

(12) United States Patent
Umeki et al.

(10) Patent No.: US 9,426,740 B2
(45) Date of Patent: Aug. 23, 2016

(54) SENSOR MODULE, SENSOR NETWORK SYSTEM, DATA TRANSMISSION METHOD, DATA TRANSMISSION PROGRAM, AND DATA COLLECTION METHOD IN SENSOR NETWORK SYSTEM

(71) Applicant: OMRON Corporation, Kyoto-shi, Kyoto (JP)

(72) Inventors: Hajime Umeki, Kyoto (JP); Ryota Yamada, Kyoto (JP); Kosuke Hayama, Kyoto (JP); Hisashi Ozawa, Kyoto (JP); Manh Tai Nguyen, Kyoto (JP); Yui Ishida, Osaka (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 170 days.

(21) Appl. No.: 14/385,073

(22) PCT Filed: Nov. 28, 2012

(86) PCT No.: PCT/JP2012/080774
§ 371 (c)(1),
(2) Date: Sep. 12, 2014

(87) PCT Pub. No.: WO2013/136604
PCT Pub. Date: Sep. 19, 2013

(65) Prior Publication Data
US 2015/0050902 A1    Feb. 19, 2015

(30) Foreign Application Priority Data

Mar. 15, 2012  (JP) ................. 2012-058523

(51) Int. Cl.
| | |
|---|---|
| *H04B 1/16* | (2006.01) |
| *H04W 52/02* | (2009.01) |
| *H04Q 9/00* | (2006.01) |
| *H04W 4/00* | (2009.01) |
| *H04L 12/24* | (2006.01) |
| *H04W 84/18* | (2009.01) |

(52) U.S. Cl.
CPC ............ *H04W 52/0225* (2013.01); *H04Q 9/00* (2013.01); *H04W 4/006* (2013.01);
(Continued)

(58) Field of Classification Search
CPC . H04L 41/08; H04L 41/0813; H04L 41/0816; H04L 41/0833; H04L 41/0893; H04L 43/08; H04W 52/02; H04W 52/0235; H04W 52/0216; H04W 52/0219; G08C 2201/12; G08C 2201/50; G08C 2200/00; G08C 17/02
USPC .................. 455/574, 343.1, 343.2, 343.4
See application file for complete search history.

(56) References Cited

U.S. PATENT DOCUMENTS

| | | | | |
|---|---|---|---|---|
| 5,390,206 A | * | 2/1995 | Rein ................. | G05D 23/1934 236/49.3 |
| 5,920,827 A | * | 7/1999 | Baer ................. | G01W 1/02 702/3 |

(Continued)

FOREIGN PATENT DOCUMENTS

| | | |
|---|---|---|
| JP | 2006-340157 A | 12/2006 |
| JP | 2010-220036 A | 9/2010 |
| JP | 4835802 B1 | 10/2011 |

OTHER PUBLICATIONS

International Search Report issued in PCT/JP2012/080774 mailed on Jan. 15, 2013 (3 pages).

*Primary Examiner* — Duc M Nguyen
(74) *Attorney, Agent, or Firm* — Osha Liang LLP

(57) ABSTRACT

A sensor module that transmits at a predetermined transmission interval, via a network, data obtained by measurement to an externally installed information processing device sets, together with a nearby sensor module, a predetermined module group in which a plurality of sensor modules for transmitting measurement data according to data processing in the information processing device are put together. Then, together with the nearby sensor modules, one sensor module among the predetermined module group is set as a reference sensor module for which a transmission interval is maintained at a predetermined transmission interval, and transmission intervals of measurement data of sensor modules other than the reference sensor module are changed to a prolonged transmission interval that is longer than the predetermined transmission interval. With this, a reduction in power consumption is realized as much as possible in the sensor module that measures environmental parameters and transmits to the information processing device.

17 Claims, 6 Drawing Sheets

(52) U.S. Cl.
CPC ....... *H04W52/0248* (2013.01); *G08C 2201/12* (2013.01); *H04L 41/0833* (2013.01); *H04Q 2209/20* (2013.01); *H04Q 2209/823* (2013.01); *H04Q 2209/826* (2013.01); *H04Q 2209/88* (2013.01); *H04Q 2209/883* (2013.01); *H04W 52/0261* (2013.01); *H04W 84/18* (2013.01); *Y02B 60/50* (2013.01)

(56) References Cited

U.S. PATENT DOCUMENTS

| | | | | |
|---|---|---|---|---|
| 6,628,208 B1* | 9/2003 | Morozumi | ............ | G08C 17/02 340/870.11 |
| 7,114,388 B1* | 10/2006 | French | ............ | G01W 1/00 73/170.16 |
| 7,525,431 B2* | 4/2009 | Britton, Jr. | ............ | G06Q 10/08 340/539.29 |
| 7,817,031 B2* | 10/2010 | Kates | ............ | G08B 1/28 340/13.26 |
| 2004/0113771 A1* | 6/2004 | Ozaki | ............ | A61B 5/0002 340/539.12 |
| 2006/0152335 A1* | 7/2006 | Helgeson | ............ | G08B 26/007 340/3.1 |

* cited by examiner

FIG. 4A

|  | Measurement value (average) | Power supply voltage | Transmission interval | Group ID |
|---|---|---|---|---|
| Sensor module (2A) | 30.0°C | 2.9V | 3sec | N/A |
| Sensor module (2B) | 30.1°C | 2.8V | 3sec | N/A |
| Sensor module (2C) | 29.8°C | 2.2V | 3sec | N/A |
| Sensor module (2D) | 25.3°C | 3.0V | 3sec | N/A |
| Sensor module (2E) | 32.4°C | 2.8V | 3sec | N/A |

FIG. 4B

|  | Target sensor module | Group setting |
|---|---|---|
| Sensor module (2A) | 2B and 2C | Not yet set |
| Sensor module (2B) | 2A and 2C | Not yet set |
| Sensor module (2C) | 2A and 2B | Not yet set |
| Sensor module (2D) | None | Not yet set |
| Sensor module (2E) | None | Not yet set |

FIG. 4C

|  | Measurement value (average) | Power supply voltage | Transmission interval | Group ID |
|---|---|---|---|---|
| Sensor module (2A) | 30.0°C | 2.9V | 3sec | G01 |
| Sensor module (2B) | 30.1°C | 2.8V | 60sec | G01 |
| Sensor module (2C) | 29.8°C | 2.2V | 60sec | G01 |
| Sensor module (2D) | 25.3°C | 3.0V | 60sec | G01 |
| Sensor module (2E) | 32.4°C | 2.8V | 3sec | N/A |

SENSOR MODULE, SENSOR NETWORK SYSTEM, DATA TRANSMISSION METHOD, DATA TRANSMISSION PROGRAM, AND DATA COLLECTION METHOD IN SENSOR NETWORK SYSTEM

TECHNICAL FIELD

One or more embodiments of present invention relates to a sensor module that transmits data obtained by measurement to an externally installed information processing device via a network, and to a sensor network system that includes the sensor module and the information processing device.

RELATED ART

Conventionally, sensor modules have been developed that measure environmental parameters such as temperature and humidity, and wirelessly transmit the measured data to an information processing device, thereby allowing a large amount of measured data to be collected easily and simply. Such a sensor module is typically configured to include an internal power source (battery) inside in order to enable measurement of data at any place for the sake of an improvement in convenience.

However, the sensor module including the battery consumes electric power by measuring data and transmitting the data, and specifically consumes significant electric power by wirelessly transmitting data, requiring maintenance such as battery change. In a conventional technique disclosed in Patent Document 1. by controlling operation of a wireless communication unit based on variation of a detection signal detected by a sensor of a sensor module itself, useless electric power consumption by the wireless communication unit is suppressed, thereby preventing a reduction in electric power of a battery.

RELATED ART DOCUMENTS

Patent Documents

Patent Document 1: JP 2006-340157A
Patent Document 2: Japanese Patent No. 4835802
Patent Document 3: JP 2010-220036A

SUMMARY OF THE INVENTION

If a sensor module that measures environmental parameters such as temperature and humidity, and transmits the measured data to an information processing device relies on an internal power source for drive power supply, the life of the internal power source is a large contributing factor for determining a maintenance period of the sensor module. Accordingly, a reduction in power consumption by the sensor module can extend the maintenance period and improve the convenience of the sensor module.

Also here in the conventional technique, a reduction in power consumption by the sensor module has been attempted and, for example, driving of the wireless communication unit of the sensor module is controlled based on a detection signal detected by the sensor module itself. Typically, in a sensor network system that collects measurement data using sensor modules, a large number of sensor modules are employed. However, data measured by the sensor modules employed in that system is not necessarily data important to the system side depending on circumstances. Accordingly, even if driving of the wireless communication unit is controlled based on a detection signal detected by its own sensor as in the conventional technique, a sufficient reduction in power consumption by the sensor modules is far from achieved since data transmission is performed irrespective of the content of the measured data.

One or more embodiments of the present invention achieve as much as possible a reduction in power consumption in a sensor module that measures environmental parameters such as temperature and humidity, and transmits the measured data to an information processing device.

According to one or more embodiments of the present invention a configuration is applied in which a transmission interval with respect to transmission from a sensor module to an information processing device that performs data collection in a sensor network system is adjusted using not only a parameter relating to the sensor module but also parameters relating to nearby sensor modules that are in the surroundings of that sensor module. With this, it is possible to transmit data measured by the sensor module to the information processing device while taking into consideration whether or not the data is ever important to data processing on the information processing device side. As a result, frequency of data transmission can be reduced as much as possible, and thereby suppression of power consumption in the sensor module is realized. Note that, in the present specification, "that sensor module" and "nearby sensor module" are expressions used for specifying sensor modules included in the sensor network system. That is, if one sensor module that belongs to a sensor network system is taken as a reference, "that sensor module" is expressed to specify the sensor module itself, and, if the one sensor module is taken as a reference, "nearby sensor module" is expressed to specify a sensor module other than that sensor module that is in the surroundings of that sensor module. Therefore, the expressions "that sensor module" and "nearby sensor module" are based on a relative relationship between the sensor modules, and thus, if a different sensor module is taken as a reference, a different sensor module can of course be specified as that sensor module. Furthermore, if there is no need for distinguishing between "that sensor module" and "nearby sensor module", merely "sensor module" is used.

In particular, one or more embodiments of the present invention are directed to a sensor module that transmits at a predetermined transmission interval, via a network, data obtained by measurement to an information processing device that is installed externally, the sensor module including; group setting means for setting, together with a nearby sensor module located in the surroundings of the sensor module, a predetermined module group in which a plurality of sensor modules for transmitting to the information processing device measurement data according to data processing in the information processing device are put together, based on predetermined parameters that relate to measurement by the sensor module and the nearby sensor module; reference sensor module setting means for setting, together with the nearby sensor module, as a reference sensor module, one sensor module for which a transmission interval of the measurement data is maintained at the predetermined transmission interval, among the predetermined module group; and transmission interval changing means for changing, if the sensor module is a sensor module other than the reference sensor module of the sensor modules included in the predetermined module group, the transmission interval of the measurement data of the sensor module to a prolonged transmission interval that is longer than the predetermined transmission interval.

In the sensor module according to one or more embodiments of the present invention, by the group setting means, not only the sensor module but also a nearby sensor module, which is in the surroundings of that sensor module, are put together and a predetermined module group for transmitting, to the information processing device, data according to data processing in the information processing device is set. This predetermined module group is a group that is set in view of making data collection by the information processing device efficient, and includes a plurality of sensor modules. If measurement data is collected from the plurality of sensor modules to the information processing device, there may be a case where measurement values are similar, or measurement data is data that is less important to data processing in the information processing device, depending on circumstances in which the sensor modules are arranged. Accordingly, as described above, based on predetermined parameters that relate to measurement by the sensor module and the nearby sensor module, the setting is performed such that a sensor module measuring data that is not necessary to be transmitted so frequently to the information processing device is put into the predetermined module group. In other words, the predetermined module group is a group that includes a sensor module for which the frequency of data transmission to the information processing device can be reduced without causing any problem in data processing in the information processing device.

Note that the predetermined parameters to which the group setting means refers when setting the predetermined module group are parameters that relate to measurement of the sensor modules as described above, that is, parameters with which the importance of the measurement data obtained by the sensor modules can be judged. Examples of the parameters may include a measurement value itself measured by the sensor modules, and the type of measurement data if multiple types of sensors are installed in the sensor modules.

Then, when the predetermined module group has been set by the group setting means, one sensor module among sensor modules belonging to the group is set, as a reference sensor module, by the reference sensor module setting means. This reference sensor module is the only sensor module for which the transmission interval is maintained at the predetermined transmission interval, among the sensor modules belonging to the predetermined module group. On the other hand, the transmission interval of the sensor module other than the reference sensor module (which may hereinafter be referred to as "non-reference sensor module") among the sensor modules belonging to the predetermined module group will be set to a prolonged transmission interval that is longer than the predetermined transmission interval by the transmission interval changing means.

As a result, in the predetermined module group, the frequency of data transmission to the information processing device from the sensor module other than the reference sensor module will be reduced. Meanwhile, not all the measurement data obtained by the sensor modules belonging to the predetermined module group are important to data processing in the information processing device because measurement values of the data are similar, for example. Therefore, it is also possible to consider that the sensor modules belonging to the predetermined module group perform sufficient data transmission in view of data collection in the information processing device, if only the reference sensor module performs data transmission at a predetermined transmission interval. Therefore, by adjusting an interval of the data transmission to the information processing device in this manner, it is possible to appropriately suppress electric power consumption by the sensor modules belonging to the predetermined module group.

Note that the reference sensor module, which is to be set by the reference sensor module setting means, may be set, based on information on power supply voltages of the sensor modules belonging to the predetermined module group, and preferably a sensor module that has a relatively high power supply voltage, more preferably a sensor module that has the highest power supply voltage is set as the reference sensor module. Since the data transmission interval of the reference sensor module is set to the predetermined transmission interval, as described above, the reference sensor module is likely to consume more electric power than that of the non-reference sensor module. Therefore, as described above, by setting a sensor module that has a relatively high power supply voltage as a reference sensor module, it is possible to prevent electric power from being unevenly consumed by the sensor modules.

The sensor module may be configured to further include transmitting and receiving means for transmitting information on a measurement state of the sensor module to the nearby sensor module and receiving, from the nearby sensor module, information on a measurement state of the nearby sensor module. In this case, the group setting means sets the predetermined module group based on the information on a measurement state of the sensor module, and the information on the measurement state of the nearby sensor module that was received by the transmitting and receiving means, serving as the predetermined parameters.

With this configuration, the sensor module can appropriately collect the information on a measurement state of the sensor module and the information on a measurement state of the nearby sensor module, thus making it possible to set a predetermined module group more appropriately. Note that, similarly to the above-described predetermined parameters, the information on a measurement state of the sensor module and the information on a measurement state of the nearby sensor module may be various types of information, such as measurement values measured by the sensor modules, types of measurement data, power supply voltages supplied for the measurement, or the like.

Here, in the above-described sensor module, if a value, serving as the predetermined parameter, of the measurement data obtained by the nearby sensor module is in a predetermined range that depends on data processing in the information processing device, the group setting means may put the nearby sensor module into the predetermined module group. That is, if a sensor module has measured a similar value of the measurement data, the sensor module that has measured this measurement data is put into the predetermined module group.

Furthermore, with respect to another aspect of the setting of the predetermined module group, in the above-described sensor module, if a value, serving as the predetermined parameter, of the measurement data obtained by the nearby sensor module has a predetermined relative relationship with a predetermined threshold that depends on data processing in the information processing device, the group setting means may put the nearby sensor module into the predetermined module group. In this context, the predetermined relative relationship refers to, for example, the relative relationship in which the value is larger or smaller than the predetermined threshold, and the specific relative relationship is preferably determined based on the content of the data processing on the information processing device side.

Furthermore, in one or more embodiments of the above-described sensor module, after a predetermined time has elapsed since one sensor module in the predetermined module group was set as the reference sensor module, the reference sensor module setting means may set again, as the reference sensor module, a sensor module other than the one sensor module of the sensor modules belonging to the predetermined module group. With this configuration, the burden of the electric power consumption in the reference sensor module can be shared between multiple sensor modules, and it is possible to prevent electric power from being unevenly consumed by the sensor modules.

Furthermore, one or more embodiments of the present invention can be understood from an aspect of a sensor network system. That is, one or more embodiments of the present invention may be understood as a sensor network system that includes a plurality of the above-described sensor modules, and the information processing device. Furthermore, one or more embodiments of the present invention may be understood from another aspect of a sensor network system configured to transmit at a predetermined transmission interval measurement data obtained through measurement by sensor modules to an information processing device from the sensor modules via a network, the sensor network system including: group setting means for setting a predetermined module group in which a plurality of sensor modules for transmitting to the information processing device measurement data according to data processing in the information processing device are put together, based on predetermined parameters that relate to measurement by the sensor modules belonging to the sensor network system; reference sensor module setting means for setting, as a reference sensor module, one sensor module for which a transmission interval of the measurement data is maintained at the predetermined transmission interval, among the predetermined module group; and transmission interval changing means for changing a transmission interval of the measurement data of a sensor module other than the reference sensor module among the sensor modules included in the predetermined module group to a prolonged transmission interval that is longer than the predetermined transmission interval.

Furthermore, in the sensor network system, each sensor module belonging to the sensor network system may be configured to include transmitting and receiving means for transmitting information on a measurement state of the sensor module to a nearby sensor module located in the surroundings of the sensor module and receiving, from the nearby sensor module, information on a measurement state of the nearby sensor module. The group setting means lets each sensor module belonging to the sensor network system set the predetermined module group, based on the information on a measurement state of the sensor module, and the information on a measurement state of the nearby sensor module received by the transmitting and receiving means, serving as the predetermined parameters, and the reference sensor module setting means lets the sensor modules belonging to the predetermined module group perform the setting of the reference sensor module, based on information on power supply voltages of the sensor modules belonging to the predetermined module group.

Furthermore, in one or more embodiments of the above-described sensor network system, if a value, serving as the predetermined parameter, of the measurement data of a sensor module is in a predetermined range that depends on data processing in the information processing device, the group setting means may put the sensor module that has measured the measurement data into the predetermined module group. Alternatively, as another aspect, if a value, serving as the predetermined parameter, of the measurement data obtained by the sensor module has a predetermined relative relationship with a predetermined threshold that depends on data processing in the information processing device, the group setting means may put the sensor module that has measured the measurement data into the predetermined module group.

Furthermore, in one or more embodiments of the above-described sensor network system, after a predetermined time has elapsed since one sensor module in the predetermined module group was set as the reference sensor module, the reference sensor module setting means may set again, as the reference sensor module, a sensor module other than the one sensor module of the sensor modules belonging to the predetermined module group.

Also in the sensor network system configured in the above-described manner, it is possible to suppress as much as possible electric power consumption in the sensor module while maintaining efficient data collection in the information processing device.

Furthermore, one or more embodiments of the present invention can be understood from an aspect of a data transmission method for transmitting at a predetermined transmission interval, via a network, data obtained by measurement from a sensor module that has performed the data measurement to an information processing device that is installed externally. That is, the data transmission method according to one or more embodiments of the present invention includes: a group setting step of setting, together with a nearby sensor module located in the surroundings of the sensor module, a predetermined module group in which a plurality of sensor modules for transmitting to the information processing device measurement data according to data processing in the information processing device are put together, based on predetermined parameters that relate to measurement by the sensor module and the nearby sensor module; a reference sensor module setting step of setting, together with the nearby sensor module, as a reference sensor module, one sensor module for which a transmission interval of the measurement data is maintained at the predetermined transmission interval, among the predetermined module group; and a transmission interval changing step of changing, if the sensor module is a sensor module other than the reference sensor module of the sensor modules included in the predetermined module group, the transmission interval of the measurement data of the sensor module to a prolonged transmission interval that is longer than the predetermined transmission interval.

Furthermore, one or more embodiments of the present invention can be understood from an aspect of a data transmission program for causing a sensor module, which transmits, via a network, data obtained by measurement at a predetermined transmission interval to an information processing device that is installed externally, to execute the following steps (1) to (3):

(1) a group setting step of setting, together with a nearby sensor module located in the surroundings of the sensor module, a predetermined module group in which a plurality of sensor modules for transmitting to the information processing device measurement data according to data processing in the information processing device are put together, based on predetermined parameters that relate to measurement by the sensor module and the nearby sensor module;

(2) a reference sensor module setting step of setting, together with the nearby sensor module, as a reference sensor module, one sensor module for which a transmission interval of the measurement data is maintained at the predetermined transmission interval, among the predetermined module group; and (3) a transmission interval changing step of changing, if the sensor module is a sensor module other than the reference sensor module of the sensor modules included in the predetermined module group, the transmission interval of the measurement data of the sensor module to a prolonged transmission interval that is longer than the predetermined transmission interval.

Furthermore, one or more embodiments of the present invention can be understood from an aspect of a method for transmitting measurement data obtained through measurement by sensor modules at a predetermined transmission interval to an information processing device from the sensor modules via a network, and collecting the measurement data in the information processing device. That is, the data collection method in a sensor network system according to one or more embodiments of the present invention including: a group setting step of setting a predetermined module group in which a plurality of sensor modules for transmitting to the information processing device measurement data according to data processing in the information processing device are put together, based on predetermined parameters that relate to measurement by the sensor modules belonging to the sensor network system; a reference sensor module setting step of setting, as a reference sensor module, one sensor module for which a transmission interval of the measurement data is maintained at the predetermined transmission interval, among the predetermined module group; and a transmission interval changing step of changing a transmission interval of the measurement data of a sensor module other than the reference sensor module among the sensor modules included in the predetermined module group to a prolonged transmission interval that is longer than the predetermined transmission interval.

Also in one or more embodiments of the present invention as the methods and the program, it is possible to suppress as much as possible electric power consumption in the sensor module while maintaining efficient data collection in the information processing device. Moreover, invention-specifying matters of the invention according to the above-described sensor module or sensor network system may be applied also to these inventions as long as no technical inconsistency arises.

In a sensor module that measures environmental parameters such as temperature and humidity, and transmits the measured data to an information processing device, it is possible to reduce power consumption as much as possible.

BRIEF DESCRIPTION OF THE DRAWINGS

FIG. 4A is a first diagram in which broadcast data on sensor modules that are compared in the measurement control shown in FIG. 3 are listed according to one or more embodiments.

FIG. 4B is a diagram showing results of data collation processing executed in the measurement control shown in FIG. 3 according to one or more embodiments.

FIG. 4C is a second diagram in which broadcast data on sensor modules that are compared in the measurement control shown in FIG. 3 are listed according to one or more embodiments.

DETAILED DESCRIPTION

Figure 1:
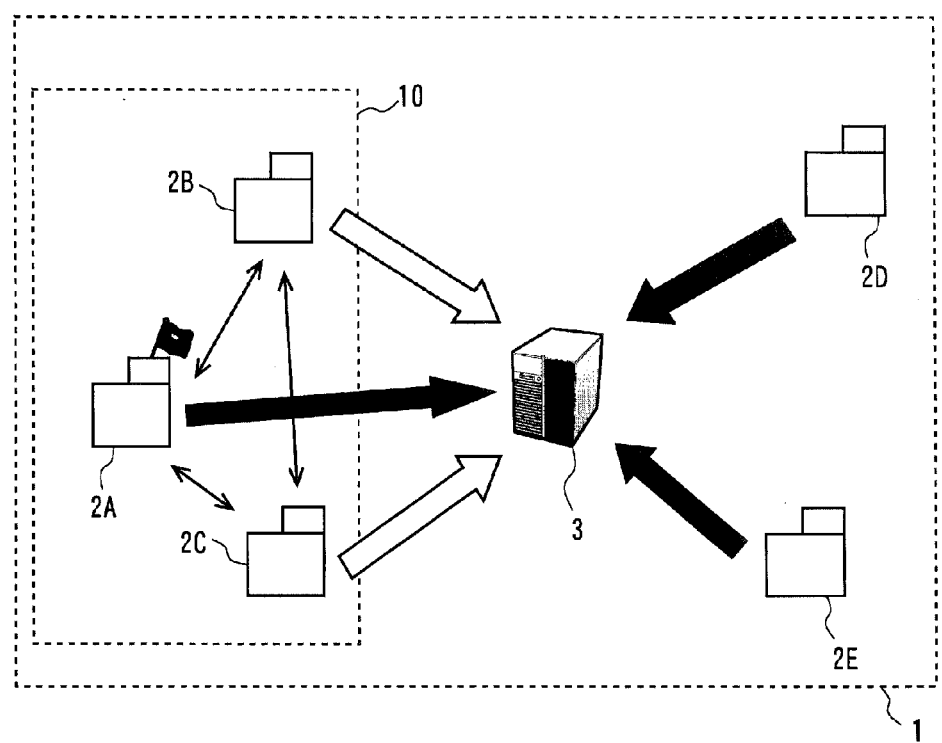
FIG. 1 is a diagram showing a schematic configuration of a sensor network system according to one or more embodiments of the present invention.

In the following, a sensor network system (which may hereinafter be referred to simply as a "system") 1 according to one or more embodiments of the present invention, and sensor modules 2 included in the system are explained with reference to the accompanying drawings. Note that since the system 1 includes a plurality of sensor modules 2, it is assumed that, if there is a need to express the sensor modules 2 with a distinction between them, a character (such as "A" or "B") for identifying an individual module is added after the reference numeral 2. The following configurations of embodiments are examples, and one or more embodiments of the present invention is not limited to the configurations of the embodiments.

FIG. 1 is a diagram showing a schematic configuration of the sensor network system 1. The system 1 includes a plurality of sensor modules 2 for measuring various external environmental parameters (such as temperature, humidity, and acceleration), and a server 3 for collecting the data measured by these sensor modules 2. A wireless network is established between the sensor modules 2 and the server 3, and the data measured by the sensor modules 2 is transmitted, via this wireless network, from the sensor module 2 to the server 3, where the transmitted data are collected and subjected to predetermined data processing. This data transmission is executed at initially set predetermined intervals, that is, repeatedly with a predetermined frequency after each sensor module 2 is powered on, in order to realize successive data collection.

In FIG. 1, five sensor modules 2A to 2E are specifically shown as sensor modules belonging to the system 1. The sensor modules 2 belonging to the system 1 are configured as small-sized devices that implement a sensor function to measure a measurement target, a function to record and process the measured data, a wireless function to perform communication to the outside of the sensor module, a power supplying function, and the like. Examples of the sensors installed in the sensor modules 2 include a physical sensor, such as a temperature sensor, a humidity sensor, an illumination sensor, a flow sensor, a pressure sensor, a ground temperature sensor, and a particle sensor, and a chemical sensor, such as a $CO_2$ sensor, a pH sensor, an EC sensor, and a soil moisture sensor. In one or more embodiments, for ease of description, it is assumed that each sensor module 2 includes only a temperature sensor for measuring an external temperature at the position at which the sensor module 2 is arranged, and the temperature data measured by the sensor module 2 is subjected to data processing (for example, processing for controlling air conditioning in a space in which the sensor module 2 is arranged) in the server 3. Furthermore, the sensor module 2 includes a memory in which measurement data obtained by the temperature sensor is recorded, a microcomputer for processing the data (arithmetic device), a communication device for externally communicating the data, and an internal battery (battery) for driving these devices.

In the sensor module 2, the internal battery supplies the entire electric power for driving the installed temperature sensor and for transmitting temperature data measured by the temperature sensor to the server 3. Therefore, when a power supply voltage of the internal battery is reduced, some kind of maintenance, such as change of the internal battery, is needed for achieving stable measurement of data and collection of the data. Accordingly, in the system 1 according to one or more embodiments of the present invention, data transmission is executed while suppressing power consumption needed for driving the sensor module, in order to reduce the number of times of such maintenance in the sensor module 2 as much as possible.

Specifically, it is premised that, looking at the measured data values (temperatures) obtained by the sensor modules 2, if a plurality of sensor modules 2 have measurement values that are close to each other to some extent, the sensor modules 2 are determined not to be arranged efficiently with respect to a temperature distribution at the point of time of the measurement. In other words, arrangement of a plurality of sensor modules 2 that measure similar measurement values at the point of time of the measurement, as described above, means that too many sensor modules 2 are driven for collecting temperature data temporarily or constantly, which is not preferable in view of electric power consumption.

Accordingly, in the system 1, the plurality of sensor modules 2 that measure similar measurement values, as described above, are put together into one module group. In the example shown FIG. 1, three sensor modules 2A, 2B, and 2C are put together into a module group 10. Among the sensor modules 2 included in the module group 10, the sensor module 2A, which serves as a reference with respect to data transmission, is allowed to transmit measurement data to the server 3 at a transmission interval as initially set. Furthermore, for other sensor modules 2B and 2C, a longer interval of data transmission is set and execution frequencies of the data transmission are reduced. With this, it is possible to achieve suppression of electric power consumed substantially by the sensor modules 2B and 2C. Note that even if the execution frequencies of the data transmission for some sensor modules 2B and 2C are substantially reduced in this way, it is considered that no significant trouble occurs in data collection also in view of data processing in the server 3 since the measurement values of the sensor modules 2B and 2C are similar to the measurement value of the sensor module 2A, which serves as a reference.

Note that the sensor modules 2D and 2E in the system 1 do not belong to the module group 10 since the data values measured by these sensor modules are not similar Therefore, intervals for data transmission performed by the sensor modules 2D and 2E are the initially set predetermined transmission interval.

In FIG. 1, arrows in black denote communication between the server 3 and the sensor modules 2A, 2D, and 2E, in which data transmission is performed at an initially set predetermined transmission interval, and arrows in white denote communication between the server 3 and the sensor modules 2B and 2C, in which data transmission is performed at a prolonged data transmission interval in order to suppress power consumption. Furthermore, the communication state shown in FIG. 1 indicates a communication state at a given point of time, and the communication state between each sensor module 2 and the server 3 changes, with the above-described control of data transmission for electric power suppression depending on the variation of the measurement value of each sensor module 2.

Figure 2:
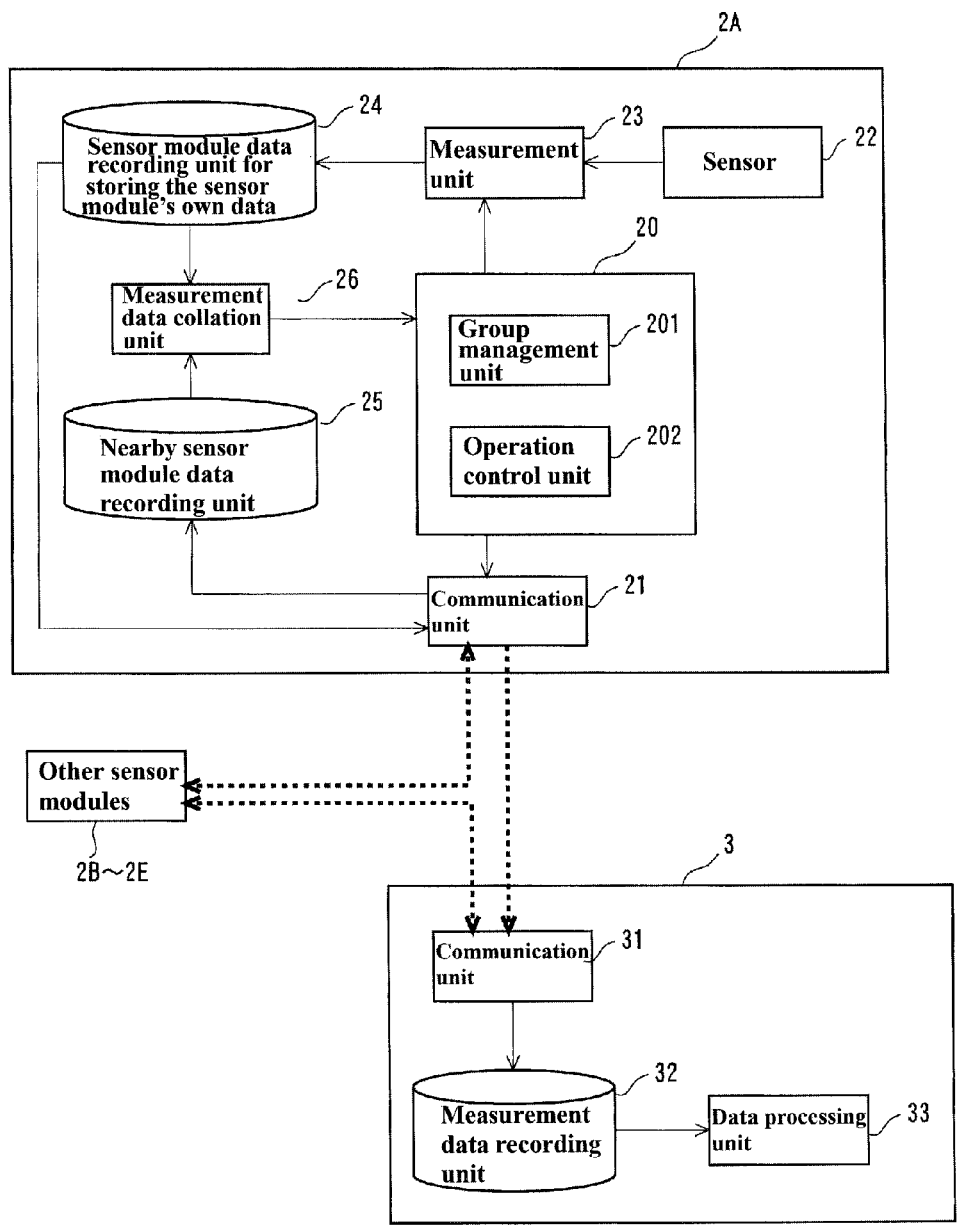
FIG. 2 is a functional block diagram showing a sensor module and a server that are included in the sensor network system shown in FIG. 1 according to one or more embodiments.

FIG. 2 is a functional block diagram showing, as images, functions of the sensor module 2 and the server 3 that belong to the system 1 shown in FIG. 1, the functions realizing the above-described control for suppressing power consumption in the sensor module 2. Note that, in FIG. 2, functional blocks of the sensor module 2A are specifically shown, but other sensor modules 2B to 2E have the same functions to those of the sensor module 2A and descriptions thereof are omitted.

The sensor module 2A includes, as functional units, a control unit 20, a communication unit 21, a measurement unit 23, a sensor module data recording unit 24 for storing the sensor module's own data, a nearby sensor module data recording unit 25, and a measurement data collation unit 26, as well as a temperature sensor, as a sensor 22, in the case of one or more embodiments. Hereinafter, each functional unit included in the sensor module 2A will be described. The control unit 20 is a functional unit that is responsible for various types of control of the sensor module 2A, and includes, in particular, a group management unit 201 and an operation control unit 202. This group management unit 201 is a functional unit that manages a module group in which the multiple sensor modules shown in FIG. 1 that measure similar data values are put together, and specifically performs management as to the belonging to a module group, for example, as to which sensor module belongs to which module group or which sensor module is excluded from which module group. The operation control unit 202 is a functional unit that performs control of operation for measurement and transmission of data of the sensor module it belongs to (in this case, the sensor module 2A). In one or more embodiments, in view of data processing (processing for controlling air conditioning) using measured temperature data in the server 3, the operation control unit 202 is responsible for temperature measurement at a time interval that is set so as to enable the processing to be performed appropriately, and for transmission of this measurement temperature data to the server 3.

Next, the communication unit 21 is a functional unit that performs communication with, that is, data transmission and reception to the outside of the sensor module 2A. Specifically, the communication unit 21 is responsible for transmission and reception between the sensor module 2A and the server 3 via a wireless network, and for data transmission and reception with other sensor modules 2B to 2E. Note that communication between each sensor module and the server 3 is mainly data transmission of measurement data. Furthermore, communication between sensor modules is data transmission performed in order to acquire information needed for determining in what measurement states other sensor modules are, and the data transmission is also referred to as "broadcast".

Next, the measurement unit 23 is a functional unit that measures, via the temperature sensor 22, the temperature of an environment in which the sensor module 2A is arranged. The temperature measurement by this measurement unit 23 is performed in response to an instruction of the control unit 20, and the measured temperature data is stored by the sensor module data recording unit 24 for storing the sensor module's own data as needed. Simultaneously, the sensor module data recording unit 24 for storing the sensor module's own data records the power supply voltage of the sensor module it belongs to, parameters relating to settings of a module group, and the like. Next, the nearby sensor module data recording unit 25 is a functional unit for storing data that relates to the measurement states of the sensor modules (hereinafter, also referred to as "nearby sensor modules") 2B to 2E, which are in the surroundings of the sensor module 2A, and is received through broadcast via the communication unit 21. The data relating to the measurement states specifically includes measurement data (measured temperature data) by each nearby sensor module, the power supply voltage of each nearby sensor module, parameters relating to settings of a module group, and the like.

The measurement data collation unit 26 is a functional unit that collates data recorded by the sensor module data recording unit 24 with data recorded by the nearby sensor module data recording unit 25, for management of a module group by the group management unit 201, and gives the collation results to the control unit 20.

Hereinafter, functional units formed in the server 3 will be described. The server 3 includes a communication unit 31, a measurement data recording unit 32, and a data processing unit 33. The communication unit 31 is a functional unit that performs communication for collecting measurement data obtained by the sensor modules 2. Specifically, the communication unit 31 is responsible for transmission and reception between the sensor modules 2 and the server 3 via the wireless network. The measurement data recording unit 32 is a functional unit that records the measurement data transmitted by the sensor modules 2 via the communication unit 31. The measurement data recorded here are given to the data processing unit 33, and the data processing unit 33 performs predetermined data processing (processing for controlling air conditioning) using the collected measurement data. Therefore, each sensor module 2 is a sensor module that measures data needed for the predetermined data processing that the data processing unit 33 is to perform.

Figure 3:
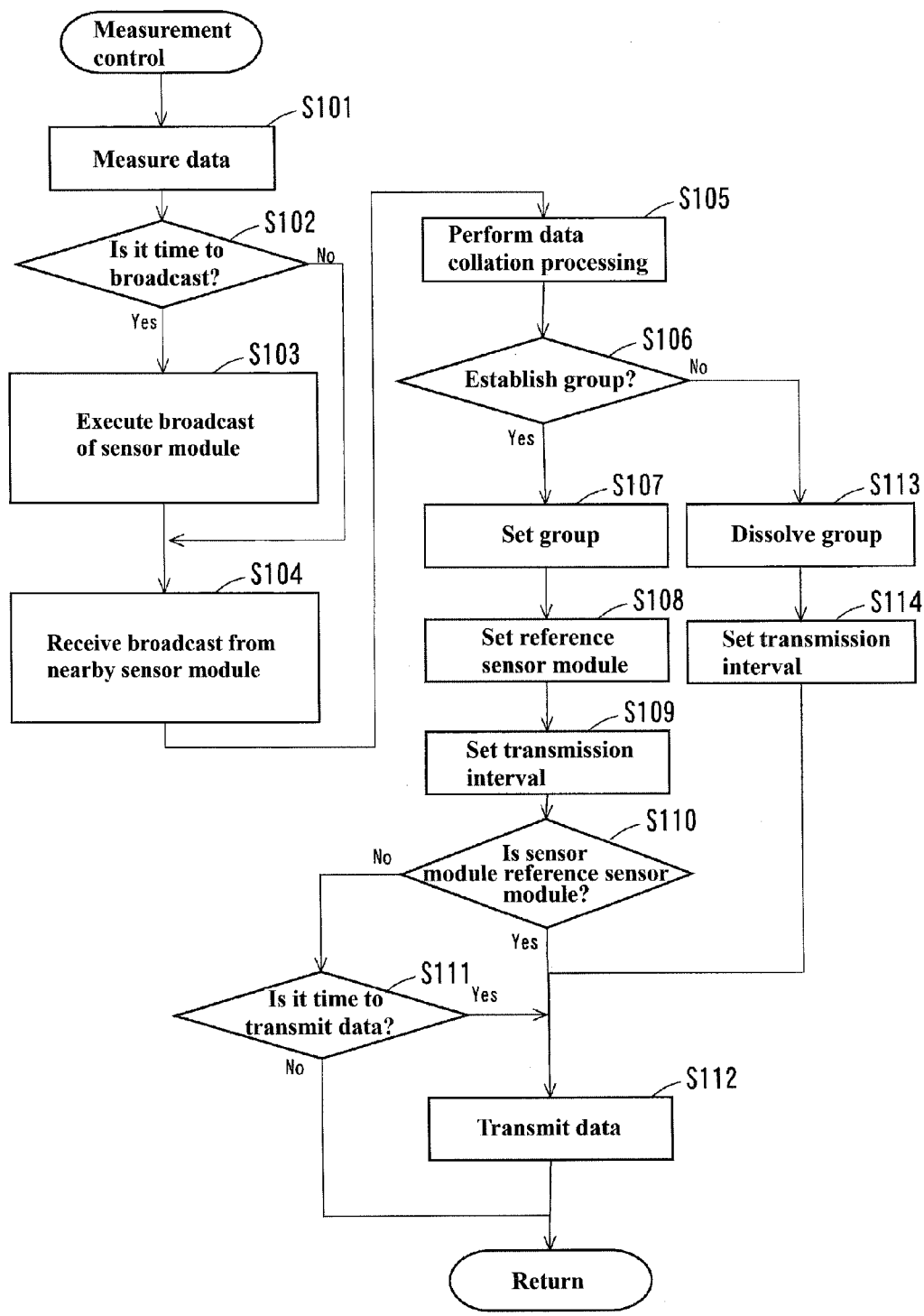
FIG. 3 is a flowchart of measurement control executed by the sensor module shown in FIG. 2 according to one or more embodiments.

Measurement control that is performed by each sensor module 2 having such a configuration will be described with reference to FIG. 3. With execution of this measurement control, suppression of power consumption in the system 1 shown in FIG. 1 will be realized. Note that the measurement control shown in FIG. 3 is performed in each sensor module 2 but, for the sake of easy understanding, the description will be given focusing mainly on the state in which the measurement control is performed in the sensor module 2A. Therefore, in the following description, mainly, the sensor module 2A is referred to as a given sensor module and the sensor modules 2B to 2E is referred to as nearby sensor modules.

The measurement control shown in FIG. 3 is performed by the control unit 20 cooperating with the measurement unit 23, the communication unit 21, the sensor module data recording unit 24 for storing the sensor module's own data, the nearby sensor module data recording unit 25, and the measurement data collation unit 26. First, in step S101, the temperature sensor 22 installed in the sensor module 2A measures temperature data. When the processing of step S101 ends, the procedure advances to step S102.

In step S102, it is determined whether it is time to broadcast target data for broadcast (hereinafter referred to as "broadcast data"), such as the temperature data measured in step S101, the power supply voltage of the sensor module, a transmission interval currently set for the sensor module, and parameters relating to a module group, to the nearby sensor modules 2B to 2E in the surroundings of the sensor module 2A. This broadcast refers to wireless communication between sensor modules that the sensor modules 2 belonging to the system 1 perform via the communication unit 21 of each sensor module, in order to mutually recognize the measurement states. This broadcast is, as described above, communication of information between sensor modules that is needed for putting sensor modules whose sensors measure similar measurement values together, and establishing a module group.

Therefore, although performing broadcast between the sensor modules at an appropriate timing does not cause a disadvantage, frequent execution of the broadcast will increase power consumption needed for the frequent execution. Accordingly, the present measurement control is configured such that if the data measurement in step S101 has been performed a predetermined number of times, the data obtained by the data measurement for that number of times are put together and broadcasted. Note that the measurement data obtained by the measurement unit 23 is successively accumulated in the sensor module data recording unit 24 for storing the sensor module's own data. Specifically, the result of step S102 is affirmative if measurement data for the predetermined number of times has been accumulated, and the procedure advances to step S103. On the other hand, the result of step S102 is negative if measurement data for the predetermined number of times has not yet been accumulated, and the procedure advances to step S104.

Then, in step S103, the broadcast data on the respective sensor module 2A is broadcast. Specifically, as described above, past measurement data for the predetermined number of times accumulated in the sensor module 2A, the data transmission interval to that time from the sensor module 2A to the server 3, the latest power supply voltage of the sensor module, a group ID for identifying a group if the sensor module 2A belongs to the module group, and the like are broadcasted to the nearby sensor modules 2B to 2E.

With respect to the broadcast from this sensor module 2A, the broadcast data is received at an appropriate timing by the nearby sensor modules 2B to 2E. Note that, in step S104, the sensor module 2A receives broadcast data from the nearby sensor modules 2B to 2E. The received broadcast data is accumulated in the nearby sensor module data recording unit 25. When the processing of step S104 ends, the procedure advances to step S105.

In step S105, the measurement data collation unit 26 performs collation processing between the broadcast data recorded in the sensor module data recording unit 24 for storing the sensor module's own data and the broadcast data recorded in the nearby sensor module data recording unit 25. The purpose of this collation processing is to recognize whether any of the nearby sensor modules 2B to 2E measures measurement values that are similar to the measurement data of the sensor module 2A, and to assemble information needed for module group setting processing, which is post processing. Here, in FIG. 4A, the broadcast data of the sensor module 2A is listed in the upper part, and broadcast data of the nearby sensor modules 2B to 2E are listed in the lower parts, in a form of table.

As described above, according to one or more embodiments, in the data collation processing according to step S105, averages of the measurement values for the predetermined number of times, power supply voltages, transmission intervals, and group IDs are collated. Note that in the state as shown in FIG. 4A, since no group ID is set, none of the sensor module and the nearby sensor modules belong to any module group, and the transmission interval is still set to 3 seconds that was initially set. Furthermore, the power supply voltage of each sensor module is up to 3.0 V, and the voltage values will decrease as the powers are used.

Hereinafter, the data collation processing performed in the sensor module 2A will be described. In one or more embodiments, each sensor module measures temperature, and the sensor modules that have measured similar measurement values are associated with one or more module groups. Specifically, it is determined that the nearby sensor modules having measured values in a range between −5% as the lower limit and +5% as the upper limit of the measurement value of the sensor module 2A are sensor modules having measured measurement values similar to that of the sensor module 2A, and are put together into a module group including the sensor module that plays a central role. In the example of FIG. 4A, since the measurement value of the sensor module 2A is 30.0° C., the nearby sensor modules 2B and 2C that have measured the values included in the range from 28.5° C. to 31.5° C. are put together.

Such data collation processing is performed also in the sensor modules 2B to 2E other than the sensor module 2A, and the results thereof are shown in FIG. 4B. That is, if the sensor module 2A is taken as a reference, the sensor modules 2B and 2C are sensor modules that are to be included in a module group of the sensor module 2A, if the sensor module 2B is taken as a reference, the sensor modules 2A and 2C are sensor modules that are to be included in the module group of the sensor module 2B, and if the sensor module 2C is taken as a reference, the sensor modules 2A and 2B are sensor modules that are to be included in the module group of the sensor module 2C. At the present time, no module group is set for the sensor modules 2A to 2C. Furthermore, with respect to the sensor module 2D, there is no sensor module that is to be included in the module group of the sensor module 2D, and the same applies to the sensor module 2E.

Based on such results of the data collation processing in step S105, the determination in the next step S106 is performed. Note that in one or more embodiments, as described above, a judgment standard as to whether or not the measurement values of the sensor modules 2 are similar is used as a requirement for establishing a module group. However, in one or more embodiments of the present invention, the requirement for establishing a module group is not limited to this judgment standard, and a requirement can suitably be set in view of efficient collection of measurement data and the resulting suppression of electric power consumption in the sensor modules. Other requirements for establishing a module group will be described later.

In step S106, it is determined whether or not to establish a module group based on the results of the data collation processing in step S105. Note that processing from this step S106 to steps S107, S108, and S111, which will be described later, is performed by the group management unit 201. With respect to the determination in step S106, specifically in the case of the sensor module 2A, the collation processing results show that the nearby sensor modules 2B and 2C are selected so as to be added to a module group and none of the nearby sensor modules 2B and 2C belongs to a module group, and thus it is determined in such a case that the selected nearby sensor modules 2B and 2C, and the sensor module 2A should constitute one module group. If the nearby sensor modules 2B and 2C are selected but the nearby sensor module 2B already belongs to a module group, that is, if a group ID for identifying the module group is given to the nearby sensor module 2B, it is determined that the sensor module 2A and the remaining nearby sensor module 2C should constitute a module group. If the result of step S106 is affirmative, that is, if it is determined that the sensor module 2A should constitute a module group with any of the nearby sensor modules, the procedure advances to step S107. On the other hand, if the result of step S106 is negative, the procedure advances to step S113.

Here, in step S107, a module group is set based on the data collation processing in step S105 and the determination in step S106. In one or more embodiments, the sensor module 2A sends, to the nearby sensor modules 2B and 2C determined to be included in the module group of the sensor module 2A, request signals for requesting the nearby sensor modules 2B and 2C to participate in the group. Similarly, in the measurement control in the case where the sensor module 2B is the given sensor module, the sensor module 2B sends, to the nearby sensor modules 2A and 2C determined to be included in the module group of the sensor module 2B, request signals for requesting the nearby sensor modules 2A and 2C to participate in the group, and in the measurement control in the case where the sensor module 2C is the given sensor module, the sensor module 2C sends, to the nearby sensor modules 2A and 2B determined to be included in the module group of the sensor module 2C, request signals for requesting the nearby sensor modules 2A and 2B to participate in the group.

Then, the sensor module that has received the request signal will accept to participate in the module group in response to the request, in principle, if the sensor module does not belong to any module group. If the sensor modules mutually accept to participate in the module group as a result of such response to the request signal, the module group including the sensor modules will be set. In one or more embodiments, the module group 10 including the sensor modules 2A, 2B, and 2C will be set if the sensor modules 2B and 2C accept to participate in response to the request signal from the sensor module 2A, similarly if the sensor modules 2A and 2B accept to particulate in response to the request signal from the sensor module 2B, and if the sensor modules 2A and 2B accept to participate in response to the request signal from the sensor module 2C (see FIG. 1). Note that with respect to the sensor modules 2D and 2E, there are no sensor modules that should be included in the own module group, no response is made to the request signal, and no module group including these sensor modules will be set (see FIG. 1). When the processing in step S107 ends, the procedure advances to step S108.

In step S108, a reference sensor module is set in the module group 10 set in step S107. This reference sensor module is a sensor module of the module group 10 that transmits measurement data to the server 3, similarly to the sensor module 2 that does not belong to the module group 10. As described above, measurement values of the sensor modules belonging to the module group 10 are similar to each other, and thus it is also possible to consider that the sensor modules are overcrowded in the module group 10 in view of efficient collection of measurement data. Accordingly, in the module group 10, mainly the reference sensor module performs data transmission, and other sensor modules (hereinafter, referred to as "non-reference sensor module") perform data transmission with lower frequency thereby transmitting only minimum required data in view of data collection, thus allowing power consumption needed for driving the non-reference sensor modules to be suppressed.

In one or more embodiments, among the sensor modules 2A, 2B, and 2C that belong to the module group 10, the sensor module having the highest power supply voltage is set as a reference sensor module. This is because the reference sensor module performs data transmission more frequently than the non-reference sensor modules, and consumes much power needed to drive the reference sensor module. Setting of the reference sensor module in the above-described manner leads to suppression of power consumption by the non-reference sensor module that has a lower power supply voltage than that of the reference sensor module. Accordingly, in one or more embodiments, among the sensor modules 2A, 2B, and 2C, the sensor module 2A that has the highest power supply voltage is set as the reference sensor module. Note that in FIG. 1, a flag for indicating the reference sensor module is added to the sensor module 2A. Note that a judgment standard for setting a reference sensor module is not limited to the above-described standard based on power supply voltages, and another rational judgment standard may be applied, whose specific example will be described later. When the processing in step S108 ends, the procedure advances to step S109.

In step S109, in each sensor module 2, an interval of data transmission is set. Note that the processing in this step S109 and the processing in step S112, which will be described later, are executed by the operation control unit 202. As described above, an initial transmission interval is set for each sensor module at the time of power on. Here, different transmission intervals are set for the sensor modules belonging to the module group 10, depending on whether a sensor module is the reference sensor module or the non-reference sensor module. This is because, as described above, the transmission frequency of the non-reference sensor module is lowered in order to suppress power consumption. Specifically, if a sensor module is set as the reference sensor module (in the case of the sensor module 2A of one or more embodiments), the transmission interval for the reference sensor module is set and maintained at an initially set transmission interval. On the other hand, if a sensor module is a non-reference sensor module (in the case of the sensor module 2B or 2C of one or more embodiments), the transmission interval of the non-reference sensor module is set to a prolonged transmission interval that is longer than the initially set transmission interval. Note that the transmission intervals of the sensor modules 2D and 2E that do not belong to the module group 10 are maintained at the initially set transmission interval as heretofore. When the processing in step S109 ends, the procedure advances to step S110.

Then, in step S110, it is determined whether or not the sensor module is the reference sensor module, and if the result is affirmative, the procedure advances to step S112, where the measurement data is transmitted at the transmission interval set in step S109 (the transmission interval that is maintained at the initial setting). On the other hand, if the result of step S110 is negative, this means that the sensor module is a non-reference sensor module, and the procedure advances to step S111 in order to perform data transmission at the above-described prolonged transmission interval. In step S111, it is determined whether or not it is time to perform data transmission in the case where the sensor module is a non-reference sensor module, that is, it is time to perform transmission at the prolonged transmission interval. If the result of this is affirmative, the procedure advances to step S112, where the measurement data is transmitted at the transmission interval (prolonged transmission interval) set in step S109.

Hereinafter, the procedure in step S113 will be described. If the result of step S106 is negative, that is, it is determined that there is no need to establish a module group in the system 1, a part or entire of the module group that has already been set is dissolved in step S113. As an example of the above-described case, broadcast data of each sensor module that was subjected to the data collation processing in step S105 is shown in FIG. 4C. In this case, a module group that is specified with a group ID "G01" has already been set for four sensor modules 2A to 2D, and the sensor module 2A has been set as the reference sensor module. FIG. 4C shows the state where, in such a case, the measurement value of the sensor module 2D largely deviates from the measurement values of the sensor modules within the same module group.

In this case, it is necessary to remove the sensor module 4D from the already set module group. Accordingly, in step S113 of the measurement control in which the sensor module is the sensor module 4D, if the sensor module 4D is the reference sensor module, the entire of the already set module group is dissolved. This is because, among the already set module group, the reference sensor module is a sensor module that mainly performs data transmission, and thus the deviation of the measurement value of the reference sensor module is considered to have occurred due to a sudden change in the measurement state of the entire module group. On the other hand, if the sensor module 4D is a non-reference sensor module (the state shown in FIG. 4C), only this sensor module 4D is removed from the already set module group, and the module group will be maintained. When the processing in step S113 ends, the procedure advances to step S114.

In step S114, the transmission interval is set according to the aspect of the dissolution of the group performed in step S113. If the sensor module 2D is the reference sensor module and the already set module group is dissolved, the transmission intervals of all the sensor modules 2A to 2D that belong to the module group are set to the initial transmission interval. Whereas, if the sensor module 2D is a non-reference sensor module, the transmission interval for the non-reference sensor module is changed from the prolonged transmission interval to the initial transmission interval. When the processing in step S114 ends, the procedure advances to step S112.

Figure 5A:
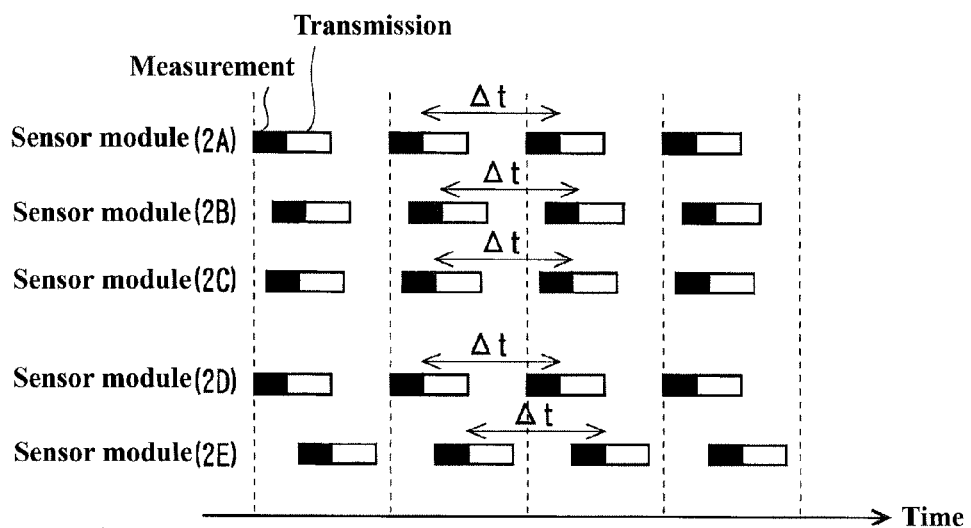
FIG. 5A is a first timing chart showing measurement and transmission of data in each sensor module in the sensor network system according to the present invention according to one or more embodiments.
Figure 5B:
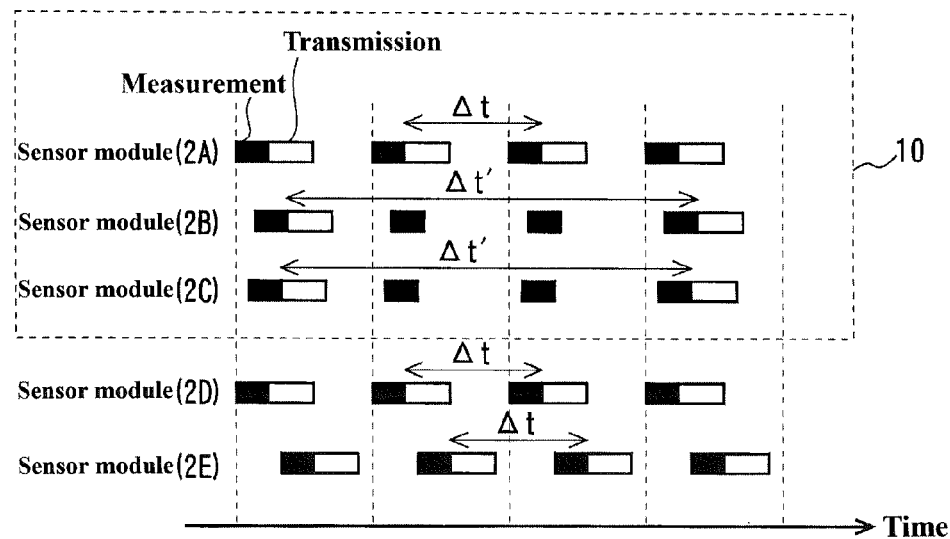
FIG. 5B is a second timing chart showing measurement and transmission of data in each sensor module in the sensor network system according to the present invention according to one or more embodiments.

Now, a description on how the setting of the transmission interval in step S109 changes data transmission of each sensor module will be given with reference to FIGS. 5A and 5B. Both figures are timing charts that relate to measurement and transmission of data in each sensor module 2, and specifically FIG. 5A is a timing chart showing the state before the setting of the module group and the setting of the transmission interval based thereon are performed, and FIG. 5B is a timing chart showing the state after the setting of the module group and the like are performed. Note that, although the sensor module 2 performs other processing, in addition to the measurement and transmission of data, both figures show only these procedures for the sake of easy understanding of one or more embodiments of the present invention.

As can be appreciated from FIG. 5A, data transmission by each sensor module 2 is repeated at an interval At. Note that, since data transmission starts at the time of power on of each sensor module, there is a slight time lag between the sensor modules. Here, if the measurement control shown in FIG. 3 is performed, the module group 10 is set by the processing in step S107, and the transmission intervals of the sensor modules 2B and 2C serving as the non-reference sensor modules are prolonged to $\Delta t'$ that is longer than the initial transmission interval $\Delta t$. Therefore, as shown in FIG. 5B, the frequency of the data transmission of the sensor modules 2B and 2C is lowered, and the initial transmission interval $\Delta t$ is maintained for the sensor module 2A serving as the reference sensor module. Furthermore, the initial transmission interval $\Delta t$ is maintained also for the sensor modules 2D and 2E that do not belong to the module group 10.

As described above, with respect to the sensor modules 2A, 2B, and 2C that are put together since they measured similar measurement values, only the sensor module 2A that serves as the reference sensor module performs data transmission at the initial transmission interval, and the sensor modules 2B and 2C that serve as the non-reference sensor modules perform data transmission with low frequency. As a result, transmission of unnecessarily many measurement results having similar values is suppressed, but minimum required data collection in view of data collection is ensured since the reference sensor module performs data transmission at a transmission interval as usual. Consequently, efficient data collection can be realized while suppressing power consumption in the non-reference sensor modules. Note that, since the sensor modules 2D and 2E that do not belong to the module group 10 perform data transmission at the initial transmission interval as usual, a failure to collect necessary measurement data can be prevented.

In the one or more embodiments, with respect to the non-reference sensor modules 2B and 2C belonging to the module group 10, the data transmission interval is prolonged to the prolonged transmission interval t' but data measurements are performed during a time period defined by the prolonged transmission interval t'. Therefore, when the non-reference sensor modules 2B and 2C perform data transmission, data measured during the time period defined by the prolonged transmission interval t' are transmitted altogether. On the other hand, instead of such a configuration, the interval of data measurement performed during the time period defined by the prolonged transmission interval t' may also be prolonged in accordance with the data transmission. In this case, in the non-reference sensor modules, it is possible to suppress electric power consumption needed for measurement and transmission of data.

Verification of the effect of one or more embodiments of the present invention

Hereinafter, it is verified how much electric power consumption in the system 1 can be reduced by the measurement control. Note that preconditions for the verification are as follows:

Conditions

The number of sensor modules belonging to the system 1 is set to 64;

It is assumed as a result of the measurement control that five module groups are set, specifically, two groups each constituted by eight sensor modules, and three groups each constituted by sixteen sensor modules;

The initial transmission interval Δt is set to 3 seconds, and the prolonged transmission interval Δt' is set to 60 seconds; and The power consumption needed for one time data transmission is 66 mA·sec for each sensor module.

Verification Results

Conventionally, that is, in the case where no measurement control is performed, and each sensor module performs data measurement and transmits the measured data at an initial transmission interval, the total sum Q1 of electric power consumption for a minute is given by:

$$Q1=66\times(60/3)\times64=84480 \text{ mA·sec}$$

On the other hand, in the case where the measurement control is performed, the number of the reference sensor modules is 5 and the number of the non-reference sensor modules is 59. and thus total sum Q2 of electric power consumption is given by:

$$Q2=66\times(60/3)\times5+66\times(60/60)\times59=10494 \text{ mA·sec}$$

Accordingly, under the above-described conditions, the measurement control can reduce power consumption by 88%.

With respect to the data collation processing according to step S105 in the measurement control shown in FIG. 3, a configuration is also possible in which, if a module group has already been set, the non-reference sensor module only collates broadcast data relating to the sensor module with broadcast data broadcasted from the reference sensor module, and not with broadcast data from other non-reference sensor modules belonging to the module group. Taking into consideration the fact that data transmission in the module group is substantially performed mainly by the reference sensor module, the module group is sufficiently and surely maintained even if the data collation processing is restricted in this manner. Furthermore, by restricting the data collation processing, it is possible to suppress power consumption needed for the data collation processing, largely contributing to a reduction in power consumption in the entire system.

The measurement control shown in FIG. 3 has described assuming that all the sensor modules broadcast the broadcast data, but a configuration is also possible in which, if a module group has already be set, the non-reference sensor modules do not perform broadcast. All the same, in one or more embodiments taking into consideration the fact that data transmission in the module group is substantially performed mainly by the reference sensor module, the module group is sufficiently and surely maintained even if broadcast is restricted in this manner. Furthermore, by restricting broadcast, it is possible to suppress power consumption needed for the broadcast, largely contributing to a reduction in power consumption in the entire system.

With respect to the setting of the reference sensor module according to step S108 in the measurement control shown in FIG. 3, in one or more embodiments, a sensor module having the highest power supply voltage among the sensor modules belonging to the module group is set as the reference sensor module, but instead, a configuration is also possible in which a sensor module that has been set as the reference sensor module the least number of times in its drive history from power on is set as the reference sensor module. As described above, the reference sensor module is considered to consume most power among the module group, and thus a sensor module that has been set as the reference sensor module the least number of times may mean that it has a relative high power supply voltage. With this, a mechanism that monitors the power supply voltage of the sensor module is no longer necessary, thus allowing the configuration of the sensor module to be simplified.

Furthermore, a configuration is also possible in which, after a predetermined time has elapsed since one sensor module belonging to the module group was set as the reference sensor module, another sensor module belonging to the module group is newly set as the reference sensor module irrespective of the measurement control shown in FIG. 3. With this, it is possible to prevent one sensor module that continuously serves as the reference sensor module from largely reducing the power supply voltage of the sensor module. A sensor module having the highest power supply voltage among the non-reference sensor modules, or a sensor module that has been set as the reference sensor module the least number of times may be set as the new reference sensor module.

In the one or more embodiments, by sensor modules 2 that belong to the system 1 cooperating with each other, setting of a module group, setting of the transmission interval of each sensor module, and the like are performed, and thus suppression of power consumption of the sensor modules is achieved. Instead of this aspect, another aspect is also possible in which these functions, that is, the setting of a module group, setting of the transmission interval of each sensor module, and the like are performed on the server 3 side. In this case, the server 3 may be configured to include functional units that correspond to the functional units in the sensor module 2 (such as a control unit 20) that are shown in FIG. 2.

In one or more embodiments, a module group in the measurement control is set based on the standard whether the measurement values of sensor modules are similar, but one or more embodiments will describe the setting of a module group based on another judgment standard, in particular, the data collation processing for obtaining information needed for the setting. For example, it is assumed that the system 1 is used for collecting room temperature data needed for performing air conditioning (cooled air conditioning) control in a relatively large room via a plurality of sensor modules 2 arranged in the room. Accordingly, it is assumed that, also in one or more embodiments, each sensor module 2 includes a temperature sensor.

Figure 6:
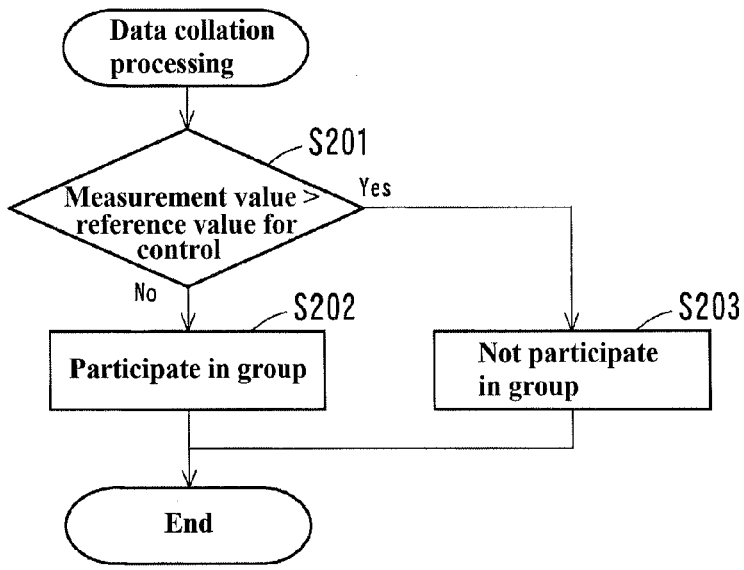
FIG. 6 shows a second example of the data collation processing executed in the measurement control shown in FIG. 3 according to one or more embodiments.

A flow of data collation processing according to one or more embodiments is shown in FIG. 6. In the data collation processing in one or more embodiments, first in step S201, it is determined whether or not a measurement value (average) measured by the sensor modules 2 subjected to the measurement control is larger than a control reference value, which serves as a reference. This control reference value refers to a threshold for determining whether or not a measured room temperature is a measurement value important to the air conditioning control applied to the system 1. In the air conditioning (cooled air conditioning) control, by measuring a place with a high room temperature, and cooling the place in a concentrated manner, it may be possible to realize efficient cooled air conditioning in the room. Therefore, this means that the measurement data on which the relative high room temperature is reflected is important to the air conditioning control, in other words, the measurement data on which the relative low room temperature is reflected cannot be important for the system 1, and even if a large amount of such data is collected, there is no opportunity to use such data for the air conditioning control, and electric power consumption needed for the data collection is relatively wasted. Therefore, in step S201, the control reference value (for example, 20° C.) set taking into consideration the control purpose of the air conditioning control is used as a threshold for determination, and it is determined whether or not a sensor module should be added to the module group.

Then, if the result of step S1201 is affirmative, this means that the measured room temperature data is higher than the control reference value and is information needed for the air conditioning control, and therefore the procedure advances to step S203. Then, in step S203, it is determined that the sensor module 2 subjected to measurement control is not a sensor module that should be added to the module group. On the other hand, if the result of step S201 is negative, that is, this means that the measured room temperature data is not higher than the control reference value and is not information important to the air conditioning control, and therefore the procedure advances to step S202. Then, in step S202, it is determined that the sensor module 2 subjected to the measurement control is a sensor module that should be added to the module group.

As described above, in the one or more embodiments only one module group is formed in the system 1. As the result of the data collation processing of one or more embodiments, the room temperature data necessary for the air conditioning control in the room, that is, the room temperature data that shows a temperature higher than the control reference value is collected in the server 3 at an initially set transmission interval, and the room temperature data that is not so necessary is collected in the server 3 with low frequency at a prolonged transmission interval. Therefore, in the system 1, it is possible to efficiently collect data, and to suppress power consumption in the sensor module as much as possible.

In the one or more embodiments, it is assumed that similarly the system 1 is used for collecting room temperature data needed for performing air conditioning (cooled air conditioning) control in a room via a plurality of sensor modules 2 arranged in the room. It is also assumed that the sensor module 2 includes, in addition to the temperature sensor, an infrared radiation sensor for detecting a human in order to perform more efficient air conditioning control.

Figure 7:
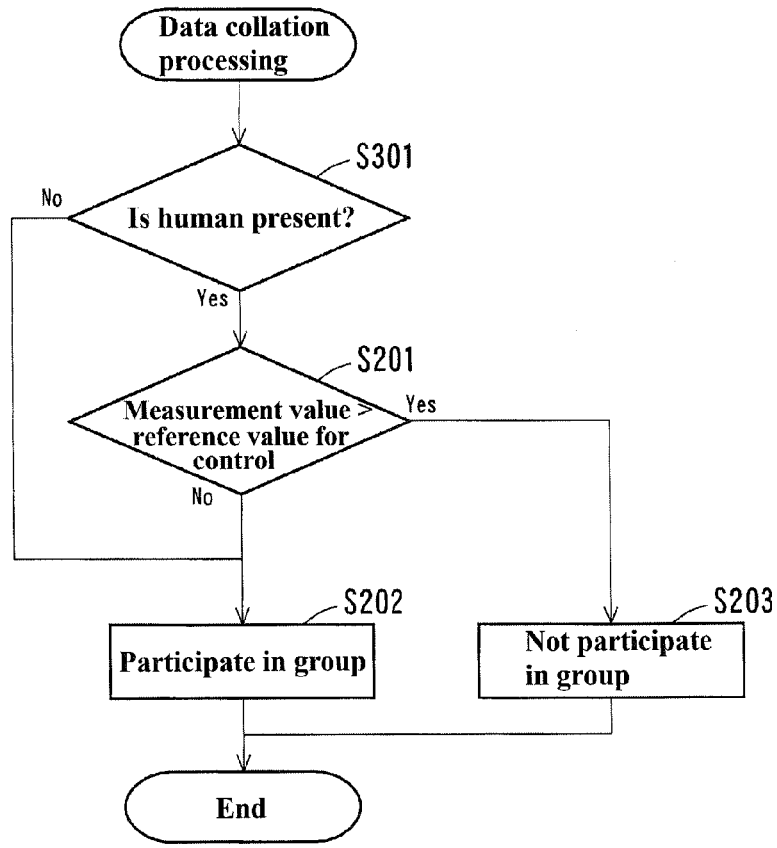
FIG. 7 shows a third example of the data collation processing executed in the measurement control shown in FIG. 3 according to one or more embodiments.

A flow of data collation processing according to one or more embodiments is shown in FIG. 7. Note that the same reference numerals as those of the processes constituting the data collation processing shown in FIG. 6 are added to processes constituting the data collation processing shown in FIG. 7, and the detailed descriptions thereof are omitted. In one or more embodiments, first in step S301, it is determined based on a detection value of the infrared radiation sensor whether or not a human (user) is present at a position of a sensor module subjected to the measurement control. If the result of step S301 is affirmative, this means that the sensor module is located at the position where air conditioning control should be performed, and thus the processes from steps S201 onward are performed. On the other hand, if the result of step S301 is negative, this means that the sensor module is located at the position where no air conditioning control is necessary to be performed, and in this case, it is determined, without performing the determination in step S201, that the measurement data obtained by the sensor module subjected to the measurement control is not so important to air conditioning control, and thus the processing in S202 will be performed.

As described above, the one or more embodiments perform the setting of a module group, taking into consideration not only measured temperatures, but also the presence of a human (user) who benefits the effect of the air conditioning control. Accordingly, in the system 1, efficient data collection and suppression as much as possible of power consumption by a sensor module can be achieved.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDEX TO THE REFERENCE NUMERALS

1 . . . Sensor network system, 2, 2A, 2B, 2C, 2D, 2E . . . Sensor module, 3 . . . Server, 10 . . . Module group

The invention claimed is:
1. A sensor module that transmits at a predetermined transmission interval, via a network, data obtained by measurement to an information processing device that is installed externally, the sensor module comprising:
  group setting means for setting, together with a nearby sensor module located in the surroundings of the sensor module, a predetermined module group in which a plurality of sensor modules for transmitting to the information processing device measurement data according to data processing in the information processing device are put together, based on predetermined parameters that relate to measurement by the sensor module and the nearby sensor module;
  reference sensor module setting means for setting, together with the nearby sensor module, as a reference sensor module, one sensor module for which a transmission interval of the measurement data is maintained at the predetermined transmission interval, among the predetermined module group; and
  transmission interval changing means for changing, if the sensor module is a sensor module other than the reference sensor module of the sensor modules included in the predetermined module group, the transmission interval of the measurement data of the sensor module to a prolonged transmission interval that is longer than the predetermined transmission interval.

2. The sensor module according to claim 1, further comprising:
transmitting and receiving means for transmitting information on a measurement state of the sensor module to the nearby sensor module and receiving, from the nearby sensor module, information on a measurement state of the nearby sensor module,
wherein the group setting means sets the predetermined module group, based on the information on a measurement state of the sensor module, and the information on the measurement state of the nearby sensor module that was received by the transmitting and receiving means, serving as the predetermined parameters.

3. The sensor module according to claim 1,
wherein the reference sensor module setting means performs, together with the nearby sensor module, the setting of the reference sensor module based on information on power supply voltages of the sensor modules belonging to the predetermined module group.

4. The sensor module according to claim 3,
wherein the reference sensor module setting means sets, as the reference sensor module, a sensor module that has the highest power supply voltage among the sensor modules belonging to the predetermined module group.

5. The sensor module according to claim 3,
wherein the reference sensor module setting means sets, as the reference sensor module, a sensor module that has been set as the reference sensor module the least number of times in a driving history from power on, among the sensor modules belonging to the predetermined module group.

6. The sensor module according to claim 1,
wherein, if a value, serving as the predetermined parameter, of the measurement data obtained by the nearby sensor module is in a predetermined range that depends on data processing in the information processing device, the group setting means puts the nearby sensor module into the predetermined module group.

7. The sensor module according to claim 1,
wherein, if a value, serving as the predetermined parameter, of the measurement data obtained by the nearby sensor module has a predetermined relative relationship with a predetermined threshold that depends on data processing in the information processing device, the group setting means puts the nearby sensor module into the predetermined module group.

8. The sensor module according to claim 1,
wherein, after a predetermined time has elapsed since one sensor module in the predetermined module group was set as the reference sensor module, the reference sensor module setting means sets again, as the reference sensor module, a sensor module other than the one sensor module of the sensor modules belonging to the predetermined module group.

9. A sensor network system comprising a plurality of the sensor modules according to claim 1, and the information processing device.

10. A sensor network system configured to transmit at a predetermined transmission interval measurement data obtained through measurement by sensor modules to an information processing device from the sensor modules via a network, the sensor network system comprising:
group setting means for setting a predetermined module group in which a plurality of sensor modules for transmitting to the information processing device measurement data according to data processing in the information processing device are put together, based on predetermined parameters that relate to measurement by the sensor modules belonging to the sensor network system;
reference sensor module setting means for setting, as a reference sensor module, one sensor module for which a transmission interval of the measurement data is maintained at the predetermined transmission interval, among the predetermined module group; and
transmission interval changing means for changing a transmission interval of the measurement data of a sensor module other than the reference sensor module among the sensor modules included in the predetermined module group to a prolonged transmission interval that is longer than the predetermined transmission interval.

11. The sensor network system according to claim 10,
wherein each sensor module belonging to the sensor network system includes:
transmitting and receiving means for transmitting information on a measurement state of the sensor module to a nearby sensor module located in the surroundings of the sensor module and receiving, from the nearby sensor module, information on a measurement state of the nearby sensor module,
the group setting means lets each sensor module belonging to the sensor network system set the predetermined module group, based on the information on a measurement state of the sensor module, and the information on a measurement state of the nearby sensor module received by the transmitting and receiving means, serving as the predetermined parameters, and
the reference sensor module setting means lets the sensor modules belonging to the predetermined module group perform the setting of the reference sensor module, based on information on power supply voltages of the sensor modules belonging to the predetermined module group.

12. The sensor network system according to claim 10,
wherein, if a value, serving as the predetermined parameter, of measurement data obtained by a sensor module is in a predetermined range that depends on data processing in the information processing device, the group setting means puts the sensor module that has measured the measurement data into the predetermined module group.

13. The sensor network system according to claim 10,
wherein, if a value, serving as the predetermined parameter, of the measurement data obtained by a sensor module has a predetermined relative relationship with a predetermined threshold that depends on data processing in the information processing device, the group setting means puts the sensor module that has measured the measurement data into the predetermined module group.

14. The sensor network system according to claim 10,
wherein, after a predetermined time has elapsed since one sensor module in the predetermined module group was set as the reference sensor module, the reference sensor module setting means sets again, as the reference sensor module, a sensor module other than the one sensor module of the sensor modules belonging to the predetermined module group.

15. A data transmission method for transmitting at a predetermined transmission interval, via a network, data obtained by measurement from a sensor module that has performed the data measurement to an information processing device that is installed externally, the method comprising:
- a group setting step of setting, together with a nearby sensor module located in the surroundings of the sensor module, a predetermined module group in which a plurality of sensor modules for transmitting to the information processing device measurement data according to data processing in the information processing device are put together, based on predetermined parameters that relate to measurement by the sensor module and the nearby sensor module;
- a reference sensor module setting step of setting, together with the nearby sensor module, as a reference sensor module, one sensor module for which a transmission interval of the measurement data is maintained at the predetermined transmission interval, among the predetermined module group; and
- a transmission interval changing step of changing, if the sensor module is a sensor module other than the reference sensor module of the sensor modules included in the predetermined module group, the transmission interval of the measurement data of the sensor module to a prolonged transmission interval that is longer than the predetermined transmission interval.

16. A data transmission program for causing a sensor module, which transmits, via a network, data obtained by measurement at a predetermined transmission interval to an information processing device that is installed externally, to execute:
- a group setting step of setting, together with a nearby sensor module located in the surroundings of the sensor module, a predetermined module group in which a plurality of sensor modules for transmitting to the information processing device measurement data according to data processing in the information processing device are put together, based on predetermined parameters that relate to measurement by the sensor module and the nearby sensor module;
- a reference sensor module setting step of setting, together with the nearby sensor module, as a reference sensor module, one sensor module for which a transmission interval of the measurement data is maintained at the predetermined transmission interval, among the predetermined module group; and
- a transmission interval changing step of changing, if the sensor module is a sensor module other than the reference sensor module of the sensor modules included in the predetermined module group, the transmission interval of the measurement data of the sensor module to a prolonged transmission interval that is longer than the predetermined transmission interval.

17. A data collection method in a sensor network system for transmitting measurement data obtained through measurement by sensor modules at a predetermined transmission interval to an information processing device from the sensor modules via a network, and collecting the measurement data in the information processing device, the method comprising:
- a group setting step of setting a predetermined module group in which a plurality of sensor modules for transmitting to the information processing device measurement data according to data processing in the information processing device are put together, based on predetermined parameters that relate to measurement by the sensor modules belonging to the sensor network system;
- a reference sensor module setting step of setting, as a reference sensor module, one sensor module for which a transmission interval of the measurement data is maintained at the predetermined transmission interval, among the predetermined module group; and
- a transmission interval changing step of changing a transmission interval of the measurement data of a sensor module other than the reference sensor module among the sensor modules included in the predetermined module group to a prolonged transmission interval that is longer than the predetermined transmission interval.

* * * * *